United States Patent [19]

Ishida et al.

[11] Patent Number: 5,725,785
[45] Date of Patent: Mar. 10, 1998

[54] METHOD FOR MANUFACTURING ACCELEROMETER SENSOR

[75] Inventors: Tatsuya Ishida; Akihiko Watanabe, both of Aichi-ken, Japan

[73] Assignee: Kabushiki Kaisha Tokai Rika Denki Seisakusho, Aichi-ken, Japan

[21] Appl. No.: 604,720

[22] Filed: Feb. 21, 1996

[30] Foreign Application Priority Data

Feb. 23, 1995 [JP] Japan ................. 7-035513

[51] Int. Cl.⁶ ........................ H01L 21/00; B44C 1/22
[52] U.S. Cl. ................ 216/2; 216/87; 156/628.1; 156/657.1; 437/228; 437/927
[58] Field of Search ............... 156/628.1, 647.1, 156/657.1, 659.11, 662.1; 216/2, 62, 87; 437/228 SFN, 927; 73/518

[56] References Cited

U.S. PATENT DOCUMENTS 4,618,397  10/1986  Shimizu et al. ............... 157/647.1 X
5,332,469   7/1994  Mastrangelo ..................... 216/2
5,344,523   9/1994  Fung et al. .................. 156/628.1
5,352,635  10/1994  Tu et al. ..................... 437/901 X

FOREIGN PATENT DOCUMENTS 6-109755   4/1994   Japan.

*Primary Examiner*—William Powell
*Attorney, Agent, or Firm*—Nikaido, Marmelstein, Murray & Oram LLP

[57] ABSTRACT

A method of manufacturing an accelerometer sensor having a mass portion is disclosed. A P-type silicon area is formed in an upper area of a P-type silicon substrate by means of impurity doping. An N-type silicon layer is formed on the silicon substrate through vapor phase epitaxy. A recess defining the mass portion is formed in the silicon substrate through an etching process. A current is supplied to the silicon substrate in an electrolytic solution, such as HF aq., while the substrate is connected to an anode of a power supply. The P-type silicon area is then converted to a porous silicon area. The porous silicon area is subjected to a wet etching to be hollowed, thus obtaining a mass portion of a desired shape.

6 Claims, 9 Drawing Sheets

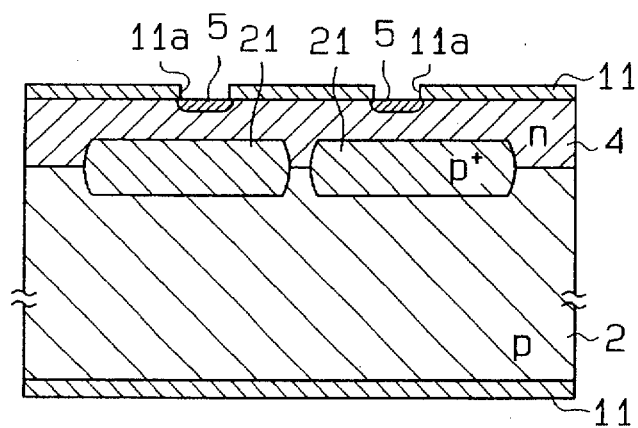
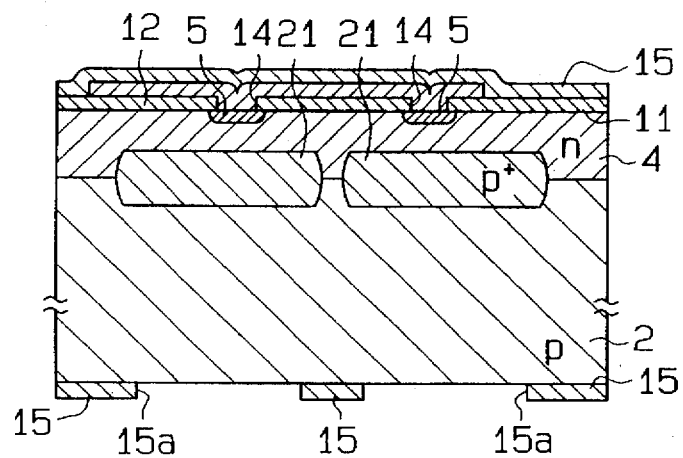
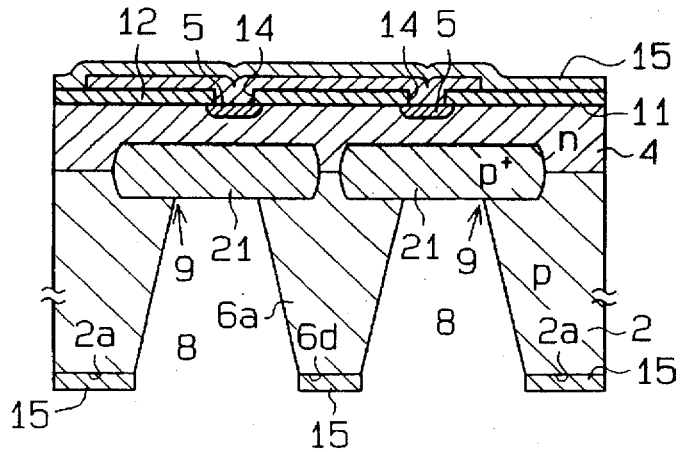

METHOD FOR MANUFACTURING ACCELEROMETER SENSOR

BACKGROUND OF THE INVENTION

The present invention relates to a method of manufacturing an accelerometer sensor. The method includes etching a silicon substrate.

Accelerometer sensors provided with bulk-type strain-gauges are used as accelerometer sensors in anti-lock braking systems (ABS), air bag systems and suspension control systems for automobiles. FIG. 1 illustrates a conventional bulk-type strain-gauge accelerometer sensor 50.

One of the steps to manufacture the accelerometer sensor 50 is to subject a lower side (i.e., bottom surface) of a parallelopiped substrate 51, made of a single crystal silicon with an orientation of (1,0,0), to selective anisotropic etching. The accelerometer sensor 50 has a thin wall 53, serving as a beam, formed on an upper side of the silicon substrate 51. The accelerometer sensor 50 also has a plurality of strain gauges 52, each of which is formed through an impurity diffusion technique, on the top surface of the thin wall 53.

A recess 55 is formed at the lower side of the accelerometer sensor 50 by anisotropic etching. As a result of the etching, a mass portion 54 defined by the recess 55 is formed at the center of the sensor 50 to protrude downward from the thin wall 53. The mass portion 54 has a shape of a truncated pyramid with four sides, and serves as a weight. When an object to which the accelerometer sensor 50 is attached is accelerated, the mass portion 54 receives a great inertial force in the direction of the acceleration. The inertia force of the mass portion 54 causes the thin wall 53 to be bent, thereby inducing strain in the strain gauges 52. This alters the resistance of each of the strain gauges 52 due to the piezo-resistance effect of silicon. The resistance alteration of the strain gauges 52 is utilized for detecting the acceleration of the object having the accelerometer sensor 50 therein.

In order to manufacture an accelerometer sensor having a desired detection sensitivity, the mass portion 54 has to be thickened to some extent. This is because the volume and weight of the mass portion 54 are as a function of its thickness, and the response of the accelerometer 50 to acceleration, i.e., detection sensitivity, is as a function of the weight of the mass portion 54. More specifically, the accelerometer sensor 50 should be manufactured with a silicon single crystal substrate 51 having a thickness, t, of at least 200 μm to 300 μm.

However, considering the characteristics of crystal anisotropic etching, thickening the silicon substrate 51 requires the enlargement of a width W2 of a proximal part 54a of the mass portion 54 and of a width W4 of an opening of the etched recess 55. Accordingly, the total width W1 of the silicon substrate 51 has to be set to correspond to the enlargement of the width W2 and W4. This prevents the downsizing of the accelerometer sensor 50. It has been suggested that a width W3 of the thin wall 53 be designed narrower, regardless of the enlargement of the widths W2 and W4, to downsize the accelerometer sensor 50. Unfortunately, the suggested design reduces the area in which the strain gauges 52 are to be formed, and therefore makes the design and/or manufacturing of the sensor difficult.

In the field of strain-gauge accelerometer sensors, there is a demand for simultaneously satisfying two different requirements, that is, downsizing of a sensor body and the improvement of sensor sensitivity by enlarging the mass portion 54.

SUMMARY OF THE INVENTION

In general, the present invention relates to a method of manufacturing a compact accelerometer sensor with an excellent sensitivity.

The accelerometer sensor manufacturing method according to the present invention includes the steps of: A) providing a first silicon layer serving as a substrate; B) forming a P-type silicon area in an upper area of the first silicon layer, by means of impurity doping; C) forming a second silicon layer on the first silicon layer through vapor phase epitaxy, so that the P-type silicon area is located between the first and second silicon layers; D) forming a recess which defines a mass portion in the first silicon layer; E) supplying a current to the first and second silicon layers in an electrolytic solution while one of the first and second silicon layers is connected to an anode of a power supply, thereby converting the P-type silicon area to a porous silicon area; and F) hollowing the porous silicon area by means of a wet etching of the porous silicon area.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 9, 10, 11, 12 and 13 are sectional views illustrating a series of steps for manufacturing an accelerometer sensor according to a second embodiment of the present invention;

DETAILED DESCRIPTION OF THE PREFERRED EMBODIMENTS

1. FIRST EMBODIMENT

A method of manufacturing a three-dimensional accelerometer sensor of a surface micromachining semiconductor type, according to a first embodiment of the present invention, will now be described with reference to FIGS. 2A and 2B to 8.

Figure 2A:
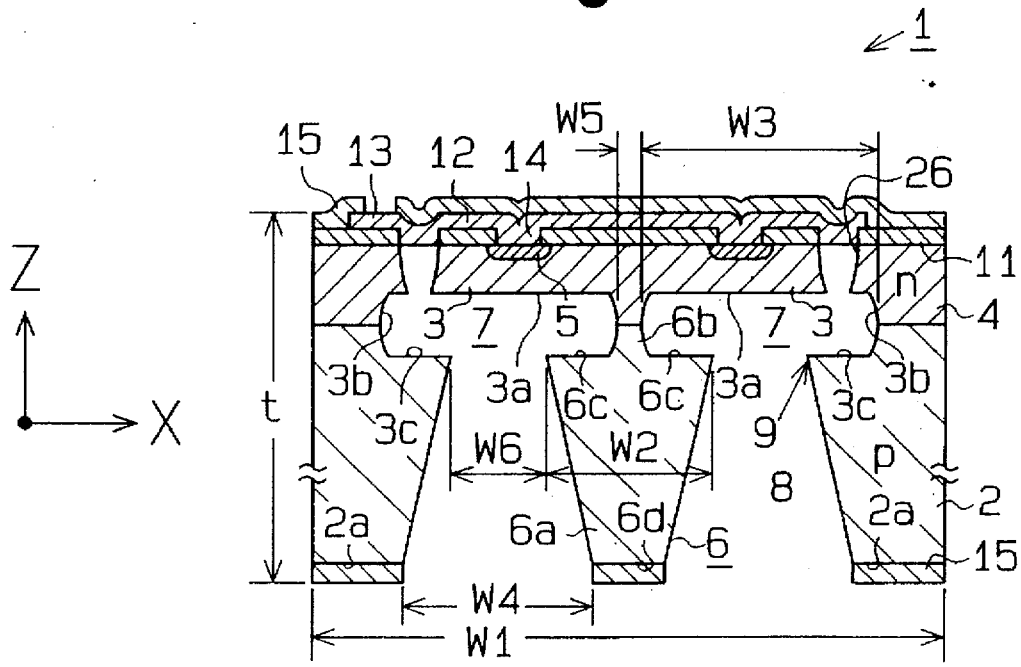
FIG. 2A is a sectional view illustrating an accelerometer sensor according to a first embodiment of the present invention.
Figure 2B:
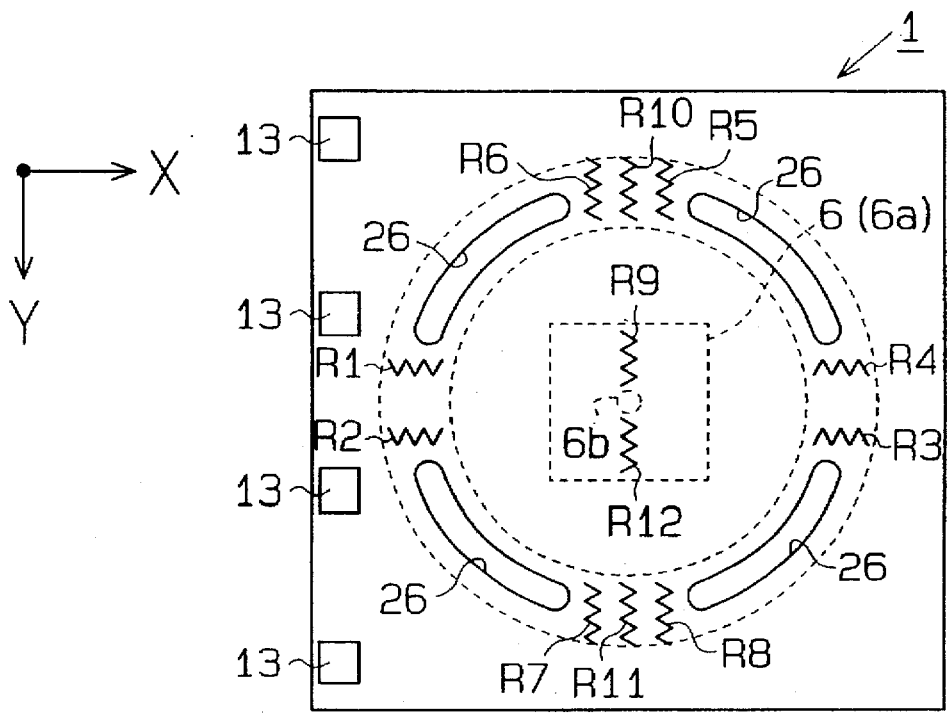
FIG. 2B is a schematic plan view illustrating the layout of strain gauges in the accelerometer sensor according to the first embodiment.

FIG. 2A schematically shows the structure of an accelerometer sensor 1 manufactured through a series of manufacturing steps according to this embodiment. The accelerometer sensor 1 has a P-type single crystal silicon substrate 2 with an orientation of (1,0,0) and a N-type silicon layer 4 (more specifically, an epitaxial layer 4 of the N-type single crystal silicon). The accelerometer sensor 1 further has a circular thin wall 3 formed in a part of the N-type silicon layer 4. As shown in FIGS. 2A and 2B, a plurality of diffusion strain gauges 5 (i.e., strain resistances R1 to R12 produced by diffusion process) are provided at an upper side of the N-type silicon layer 4.

The accelerometer sensor 1 has a mass portion 6 protruding downward from a lower side 3a of the thin wall 3. The mass portion 6 is formed by subjecting the silicon substrate 2 to crystal anisotropic etching. The mass portion 6 therefore consists of P-type single crystal silicon. The mass portion 6 has an inverted truncated pyramid portion 6a with four sides, which constitutes a main part of the mass portion 6, and a cylindrical portion 6b located above the truncated pyramid portion 6a. The truncated pyramid portion 6a is coupled to a center of the lower side 3a of the thin wall 3 via the cylindrical portion 6b.

The upper half of the cylindrical portion 6b is composed of a part of the epitaxial growth layer 4 of N-type single crystal silicon, while the lower half of the cylindrical portion 6b is composed of P-type single crystal silicon which also constitutes the truncated pyramid portion 6a. As shown in FIG. 2A, the cylindrical portion 6b has a narrower diameter at the middle than the upper and lower ends. The accelerometer sensor 1 has a circular recess 8 formed, by crystal anisotropic etching, to open on the bottom side of the silicon substrate 2. The recess 8 is defined by a tapered wall whose diameter becomes narrower toward its upper end. The above-mentioned truncated pyramid portion 6a of the mass portion 6 is disposed in the recess 8.

A substantially vertical wall 3b is formed in the part of the N-type silicon layer 4 to face the cylinder portion 6b. The lower end of the wall 3b is connected to a wall 3c which faces the lower side 3a of the thin wall 3. The accelerometer sensor 1 has a doughnut-shaped inner space 7 defined by the lower side 3a of the thin wall 3, the cylindrical portion 6b, an upper side 6c of the truncated pyramid portion 6a, the walls 3b and 3c. The inner space 7 is formed by performing an etching by alkali to a porous P-type silicon area, as described later. The inner space 7 communicates with the etched recess 8 via a through hole 9 formed beneath the inner space 7. As shown in FIGS. 2A and 2B, the accelerometer sensor 1 also has four openings 26, which communicate with the inner space 7 and are formed at predetermined locations of the thin wall 3.

As shown in FIG. 2A, a thin silicon dioxide ($SiO_2$) film 11 is formed on the epitaxial growth layer 4. An aluminum wiring pattern 12 is formed on the silicon dioxide film 11, by means of a physical film forming process, such as sputtering and vacuum deposition. The silicon dioxide film 11 serves as an interlayer insulation. The silicon dioxide film 11 has a plurality of contact holes 14 for interlayer connection, formed above the strain gauges 5. The wiring pattern 12 is electrically connected to the strain gauges 5 via the contact holes 14.

The accelerometer sensor 1 has a thin passivation film 15 formed over the silicon dioxide film 11 and the wiring pattern 12 in order to complete the insulation of the accelerometer sensor surface. The passivation film 15 is formed by means of a physical film forming process, such as sputtering and vacuum deposition. Part of the wiring pattern 12 is exposed at openings formed in the passivation film 15. The exposed part serves as bonding pads 13 for connecting the accelerometer sensor 1 with external devices or circuits. Another passivation film 15 is also formed on the lower side 2a of the silicon substrate 2 and on the lower side 6d of the truncated pyramid portion 6a.

The measurements of the accelerometer sensor 1 are as follows. Referring to FIG. 2A, a total width W1 of the accelerometer sensor 1 preferably ranges from 1000 μm to 2000 μm, and a thickness or height, t, of the sensor 1 preferably ranges from 300 μm to 600 μm. In this embodiment, the width W1 and the thickness t of the accelerometer sensor 1 are set to 1500 μm and 300 μm, respectively. The thickness of the epitaxial growth layer 4 preferably ranges from 10 μm to 20 μm.

In this embodiment, the thickness of the layer 4 is set to 10 μm. The thickness of the silicon dioxide film 11 preferably ranges from 0.5 μm to 1 μm. In this embodiment, the thickness of the film 11 is set to 1 μm. The thickness of the passivation film 15 preferably ranges from 0.5 μm to 1 μm. In this embodiment, the thickness of the passivation film 15 is set to 1 μm.

Referring to FIG. 2A, a maximum width W2 of the truncated pyramid portion (i.e., the width of the upper side 6c) preferably ranges from 400 μm to 800 μm. In this embodiment, the maximum width W2 is set to 500 μm. Setting the width W2 smaller than 400 μm makes it very difficult to improve the sensitivity of the accelerometer sensor 1 by enlarging the mass portion 6.

The width W3 of the inner space 7 preferably ranges from 400 μm to 800 μm. In this embodiment, the width W3 of the inner space 7 is set equal to the width of the thin wall 3, i.e., approximately 500 μm. Setting the width W3 smaller than 400 μm reduces the area on which the strain gauges 5 are provided, while setting the width W3 wider than 800 μm makes downsizing of the sensor difficult.

The width W4 of the lower opening of the etched recess 8 preferably ranges from 500 μm to 800 μm. In this embodiment, the width W4 is set to approximately 500 μm.

An average diameter W5 of the cylindrical portion 6b preferably ranges from 10 μm to 100 μm. Setting the average diameter W5 smaller than 10 μm may weaken the mechanical strength of the sensor. In this embodiment, the average diameter W5 of the cylindrical portion 6b is set at approximately 30 μm.

A width W6 of the through hole 9 preferably ranges from 50 μm to 200 μm. In this embodiment, the width W6 of the through hole 9 is set at approximately 100 μm. In the accelerometer sensor 1 according to this embodiment, the width W3 of the inner space 7 is set wider than the width W6 of the through hole 9.

FIG. 2B illustrates the layout of the strain gauges 5 (i.e., strain resistors R1 to R12). The strain resistors R1 to R12 are disposed along the vertical and horizontal center lines of the sensor body. More specifically, the resistors R1 and R2 are placed in parallel with respect to each other and on the left of the vertical center line of the sensor body, while the resistors R3 and R4 are placed in parallel to each other and on the right of the vertical center line of the sensor body. The resistors R5, R6 and R10 are placed in parallel to each other and above the horizontal center line, while the resistors R7, R8 and R11 are placed in parallel to each other and below the horizontal center line. Further, resistors R9 and R12 are placed on the line on which resistors R10 and R11 are placed.

Figure 3A:
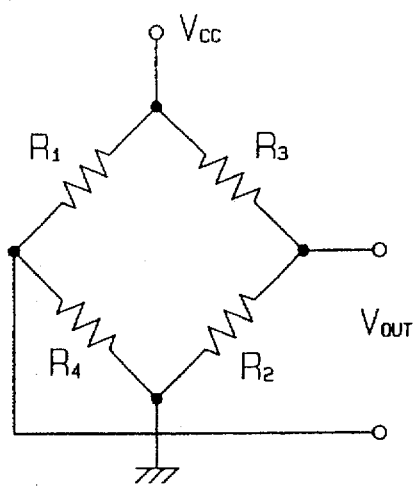
FIGS. 3A, 3B and 3C show circuit diagrams equivalent to detecting circuits consisting of a plurality of strain gauges (i.e., resistances) provided in the accelerometer sensor.
Figure 3B:
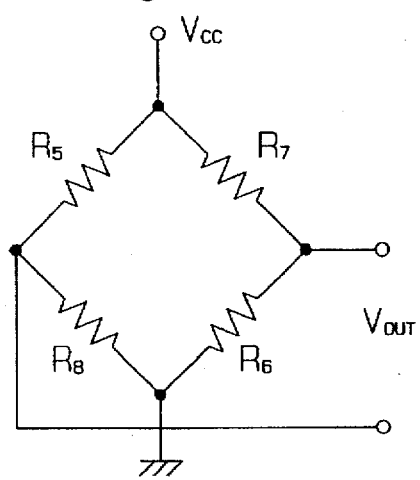
Figure 3C:
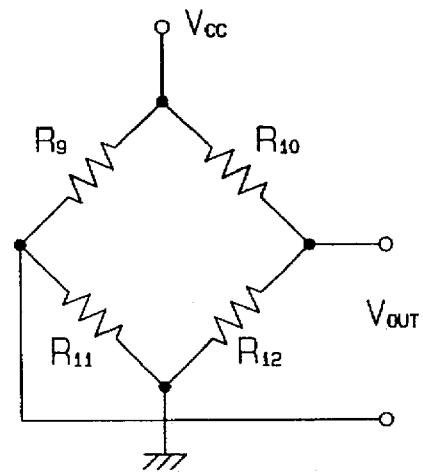
Figure 4:
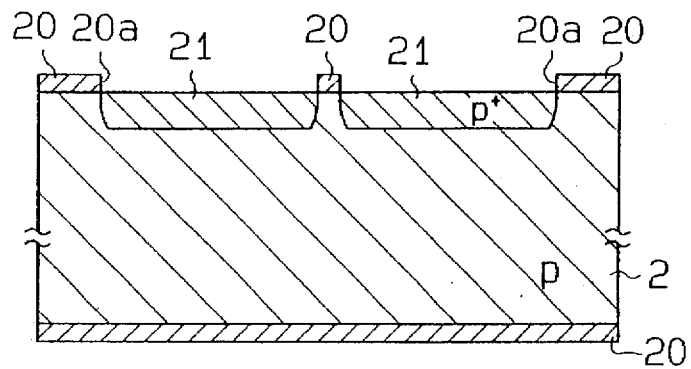
FIGS. 4, 5, 6, 7 and 8 are sectional views illustrating a series of steps for manufacturing the accelerometer sensor according to the first embodiment.

FIG. 3A is an equivalent circuit diagram illustrating a circuit consisting of four resistors R1 to R4. This circuit is designed to detect acceleration in a direction X. FIG. 3B is an equivalent circuit diagram illustrating a circuit consisting of four resistors R5 to R8. This circuit is designed to detect acceleration in a direction Y. FIG. 3C is an equivalent circuit diagram illustrating a circuit consisting of four resistors R9 to R12. This circuit is designed to detect acceleration in a direction Z. In the resistors R1 to R4 connected to form a bridge as illustrated in FIG. 3A, the node between the resistors R1 and R3 is connected to a bonding pad 13 connected to a power supply Vcc, while the node between the resistors R2 and R4 is connected to a boding pad 13 connected to the ground. The node between the resistors R1 and R4 and the node between the resistors R2 and R3 are connected to bonding pads 13 for use as outputs. The circuit consisting of the resistors R5 to R8 and the circuit consisting of the resistors R9 to R12 are also connected to the bonding pads 13 in the same way as the circuit illustrated FIG. 3A.

When an object to which the accelerometer sensor 1 is attached is accelerated, the mass portion 6 receives an inertia force in the direction of the acceleration. The inertia force of the mass portion 6 causes the thin wall 3 to be bent, thereby straining some of the strain gauges 5 (i.e., resistors R1 to R12). This alters the resistance of the strained strain gauges 5 due to the piezo-resistance effect of silicon. The resistance alteration of the strain gauges 5 is utilized for detecting the direction and magnitude of the acceleration.

A series of steps to manufacture the accelerometer sensor 1 will now be described with reference to FIGS. 4 to 8.

A parallelepiped substrate 2 made of P-type single crystal silicon with an orientation (1,0,0) is used in this case. By placing the substrate 2 in an oxidative atmosphere at high temperature, thin oxide films 20 are formed as masks on the upper and lower surfaces of the substrate 2. Then, by subjecting the substrate 2 to a photo-etching process, a circular opening 20a is formed in the upper oxide film 20, leaving a part of the oxide film 20 in the center of the opening 20a. The opening 20a occupies the area where the inner space 7 is to be formed. The part of the film 20 left in the opening 20a is placed at the area where the cylindrical portion 6b is to be formed.

Borons (B) are implanted in the silicon substrate 2 by means of ion implantation and then are diffused by means of thermomigration. This step forms a P-type silicon area 21 in the upper side area of the silicon substrate 2.

Figure 5:
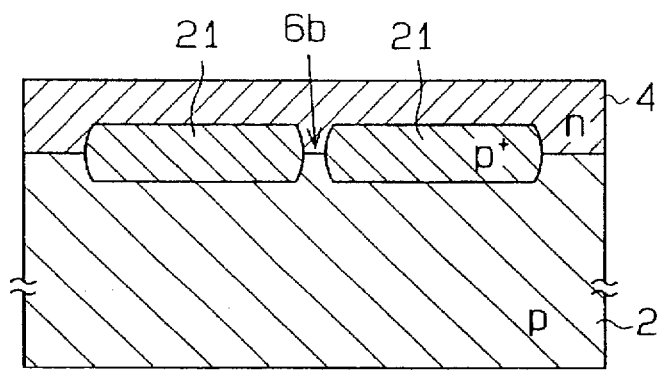

Then, as shown in FIG. 5, the epitaxial growth layer 4 of N-type single crystal silicon is formed on the silicon substrate 2 by means of vapor phase epitaxy. This step buries the P-type silicon area 21 between the epitaxial layer 4 and the substrate 2. Due to so-called creeping, the borons are diffused from the P-type silicon area 21 to the epitaxial layer 4 so that the P-type silicon area 21 expands to fill a part of the epitaxial layer 4. As a result, as shown in FIG. 5, a part, by which the cylindrical portion 6b of the mass portion 6 is formed, is located in the center of the P-type silicon area 21.

Figure 6:
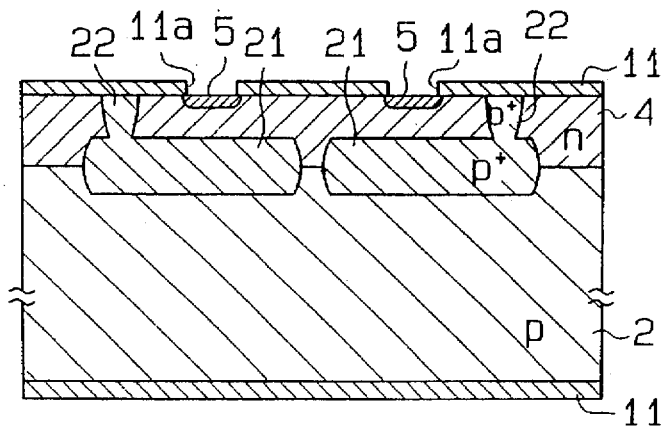

Thereafter, through the same steps as mentioned above, an oxide film (not shown) is formed as a mask on an upper surface of the silicon substrate which is integrated to the epitaxial layer 4. The mask is then subjected to a photo etching to form an opening in the mask. Borons are implanted in the epitaxial layer 4 by means of ion implantation through the opening of the mask, and then are diffused by means of thermomigration. This step forms four P-type silicon areas 22 in the epitaxial layer 4 (only two areas 22 are shown in FIG. 6) for use in the formation of openings 26. The bottom end of each P-type silicon area 22 connects the buried P-type silicon area 21. In this embodiment, each of the P-type silicon areas 22 are located above the area where the inner space 7 is to be formed.

Through the same procedures as mentioned above, an oxide film 11 is formed as a mask on the epitaxial layer 4, as shown in FIG. 6. Openings 11a are formed in the mask 11 at predetermined positions, by means of photo etching. Borons are implanted in the epitaxial layer 4 by means of ion implantation, and then are diffused through thermomigration. This step allows the strain gauges 5 to be formed in a part of the layer 4 forming the upper side of the thin wall 3.

Figure 7:
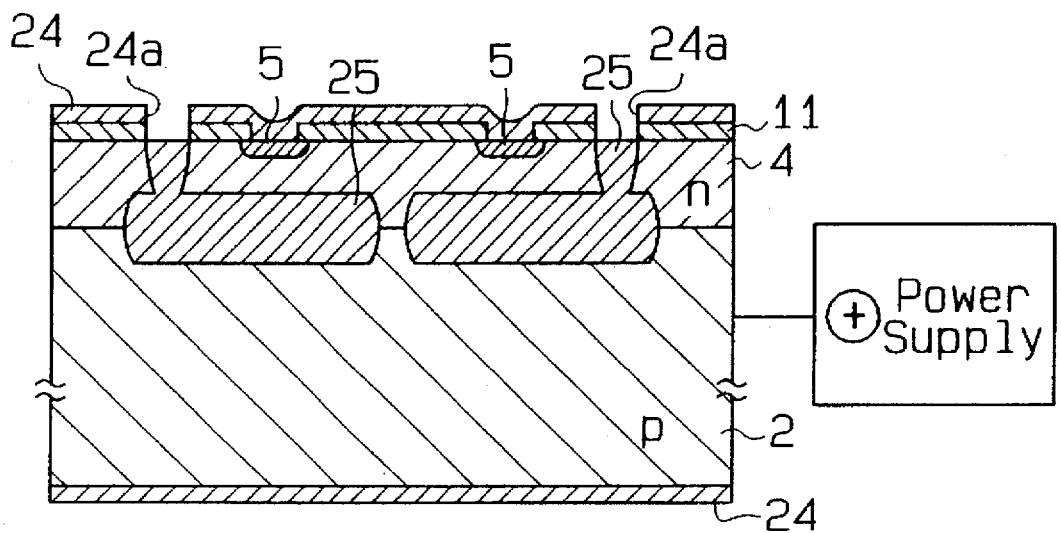

Next, as shown in FIG. 7, an etching resist 24 covers the whole surface of the silicon dioxide film 11 covering the epitaxial layer 4. The etching resist 24 is then subjected to photolithography to form openings 24a in the resist 24 above the P-type silicon area 22. The whole substrate including the silicon substrate 2 is soaked in a highly concentrated solution of hydrofluoric acid (HF). With this condition, current is supplied to the acidic solution while the silicon substrate 2 is connected to an anode of a power supply. Such treatment with current supply in an electrolytic solution is called Anodization. The anodization causes the P-type silicon areas 21 and 22 to be selectively made porous, so that the P-type silicon areas 21 and 22 are changed to a P-type porous silicon area 25 shown in FIG. 7.

The preferable conditions of the anodization according to this embodiment are as follows:

Current: 1 mA/cm2 to 100 mA/cm2

Time of Current Supply: 10 minutes to 600 minutes

Temperature of HF Solution: 10 C. to 70 C. (degrees Celsius)

Figure 8:
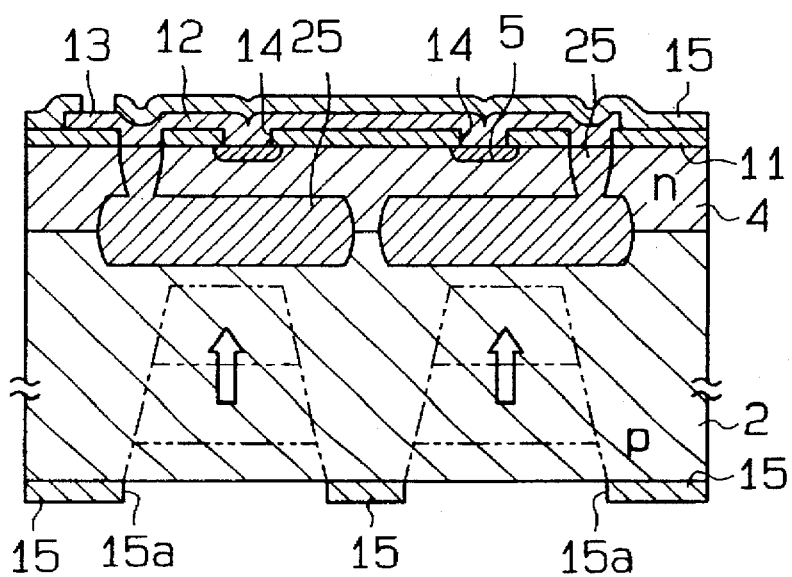

After the completion of anodization, the etching resist 24 is removed. The contact holes 14 are formed in the oxide film 11 by means of photoetching. The wiring pattern 12 shown in FIG. 8 is formed on the oxide film 11 by the steps of sputtering of Al or vacuum deposition of Al followed by photolithography. Silicon nitride, such as SiN and $Si_3N_4$, is accumulated on the upper and lower sides of the substrate while being manufactured, by vapor deposition technique such as chemical vapor deposition (CVD). As a result, the upper passivation film 15 over the wiring pattern 12 is obtained. Part of the wiring pattern 12 is exposed from openings formed in the upper passivation film 15. The exposed part of the wiring pattern 12 serves as a bonding pad 13.

An opening 15a is formed in the lower passivation film 15 provided on the bottom surface of the silicon substrate 2 through a wet etching with an alkali as an etchant. The lower passivation film 15 also serves as a mask in later steps as described later. A part of the lower passivation film 15 is left in the opening 15a. The left part forms a part of the truncated pyramid portion 6a of the mass portion 6.

The silicon substrate 2 is subjected to a crystal anisotropic etching with TMAH (tetramethylammonium hydroxide) as an etchant. Consequently, a part of the silicon substrate 2 is scooped out as shown in FIG. 8 by phantom lines (i.e., two-dotted chain lines). As the etching proceeds, the upper bottom of the etched recess 8 gradually goes up in the substrate 2 and eventually reaches the bottom end of the porous silicon area 25. Subsequently, the porous silicon area 25 is etched by anisotropic etching with TMAH.

Since the P-type silicon areas 21 and 22 become porous due to the anodization, the porous silicon area 25 is easily soluble by alkali. Therefore, the porous silicon area 25 can be easily removed or etched by alkali, compared with the other parts that are not modified by the anodization. Due to the difference between alkali etching speeds at the porous silicon area 25 and the unmodified parts other than the porous area 25, the porous silicon area 25 is changed to a vacant inner space 7 while a central portion of the substrate undissolved is left as the mass portion 6. Thus, the accelerometer sensor 1 shown in FIG. 2A is obtained.

The preferable conditions of the wet etching using TMAH are as follows:

Treatment time: 10 seconds to 600 seconds

Treatment temperature: 20 C. to 40 C. (degrees Celsius)

The advantages of the accelerometer 1 according to the first embodiment and its manufacturing method will now be described.

Figure 1:
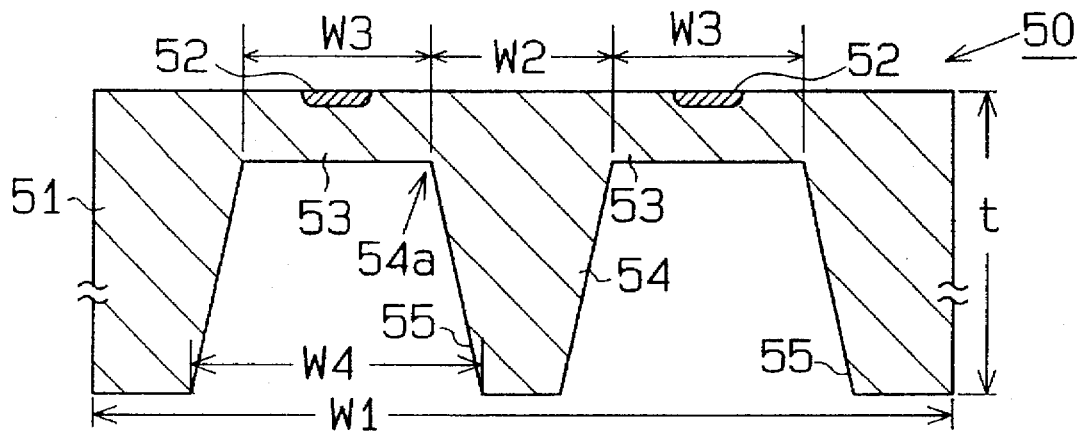
FIG. 1 is a sectional view of a conventional accelerometer sensor.

In the conventional accelerometer sensor 50 shown in FIG. 1, the width W3 of the thin wall 53 correlates to the width W4 of the etching recess 55. That is, in order to enlarge the width W3, the width W4 has to be enlarged. In contrast, in the case of the accelerometer sensor 1 shown in FIG. 2A, the width W6 of the through hole 9 correlates to the width W4 of the opening, but the setting of width W3 is not correlative to or independent from the setting of the width W6. According to the present invention, therefore, it is easy to design the width W3 of the inner space 7, which corresponds to the width of the thin wall 3, wider than the width W6 of the through hole 9. Consequently, according to the present invention, the sufficiently wide area for the strain gauges 5 can be obtained without increasing the width W1 of the silicon substrate 2.

The width of the part constituting a vibrated element of the conventional accelerometer sensor 50 is equal to the length obtained by adding the width W2 of the proximal portion of the mass portion 6 to the doubled width W3 of the thin wall 53, i.e., 2(W3)+W2. In contrast with this, the width of the part constituting a vibrated element of the accelerometer sensor 1 according to the present invention is equal to the length obtained by adding the average width W5 of the cylindrical portion 6b to the doubled width W3 of the inner space 7, i.e., 2(W3)+W5. Since the proximal portion of the mass portion 6 is constricted, the width W5 is considerably narrower than the width W2. The length of 2(W3)+W5 is therefore shorter than the length of 2(W3)+W2. This allows the design of the sensor having a sufficiently wide area for the strain gauges 5 without enlarging the total width W1 of the silicon substrate 2.

In the accelerometer sensor 1 according to the present invention, a part of the epitaxial growth layer 4 of N-type single crystal silicon forms the thin wall 3. Accordingly, strain gauges 5 made of the P-type silicon having a large gauge factor can be formed in the thin wall 3. In other words, the manufacturing process according to the present invention enables the production of a compact accelerometer sensor 1 with a high sensitivity. One of the characteristics of the present invention is to form the inner space 7 by taking advantage of the difference in etching speeds at a porous part and non-porous part. This makes the etching process controllable. The process according to the present invention make the formation of a mass portion 6 easy, even when the portion 6 has a complicated shape.

2. SECOND EMBODIMENT

A method of manufacturing a three-dimensional accelerometer sensor of a surface micromachining semiconductor type, according to a second embodiment of the present invention, will now be described with reference to FIGS. 9 to 13. As shown in FIG. 13, an accelerometer sensor 31 of the second embodiment has almost the same design as the accelerometer sensor 1 of the first embodiment except that the sensor 31 does not have the openings 26 of the sensor 1. Therefore, to avoid the redundant description, the same reference numerals are given to those components which are the same as the corresponding components of the first embodiment. The measurements of the sensor 31 are the same as the corresponding measurements of the sensor 1.

The accelerometer sensor 31 is manufactured through a series of the steps described below. First, the P-type silicon area 21 and the epitaxial growth layer 4 are formed on the silicon substrate 2 by following the steps described in the first embodiment (see FIGS. 4 and 5). Next, without carrying out the step for forming the P-type silicon area 22, the formation of strain gauges is carried out.

As shown in FIG. 9, the first step for forming the strain gauges is to form an oxide film 11 having openings 11a on the epitaxial layer 4. In the second step, Borons are implanted in the epitaxial layer 4 via the openings 11a and are then diffused due to thermomigration. Thus, the strain gauges 5 are provided in the area which is to become the upper side of the thin wall 3.

Next, contact holes 14 and wiring pattern 12 are formed following the procedure described in the first embodiment. Silicon nitride, such as SiN and $Si_3N_4$, is accumulated on the upper and lower surfaces of the substrate to form the passivation films 15 as shown in FIG. 10, through vapor disposition technique such as CVD. An opening 15a for crystal anisotropic etching is formed in the lower passivation film 15 with a part of the lower passivation film 15 left in the opening 15a.

The silicon substrate 2 is subjected to a wet etching with TMAH as an etchant to form an etched recess 8 as shown in FIG. 11. As the etching proceeds, the upper bottom of the etched recess 8 gradually goes up in the substrate and eventually reaches the bottom of the P-type silicon area 21. The etching stops at the bottom of the P-type silicon area 21.

Figure 12:
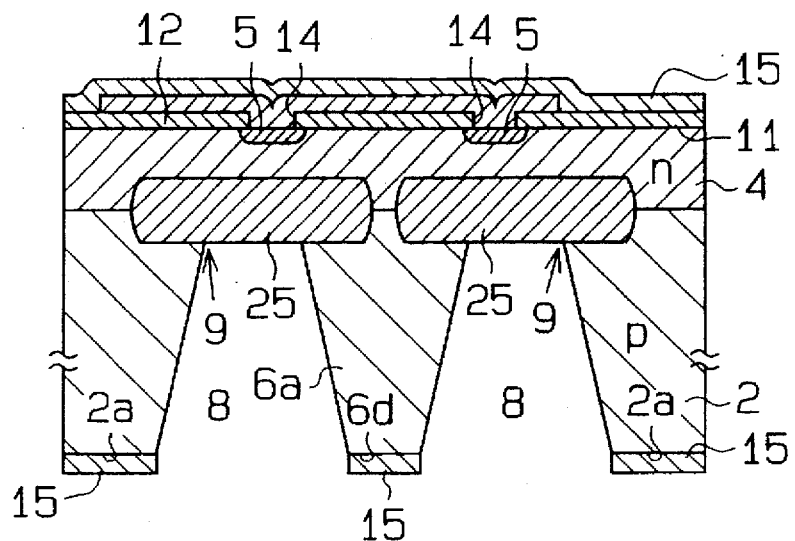
Figure 13:
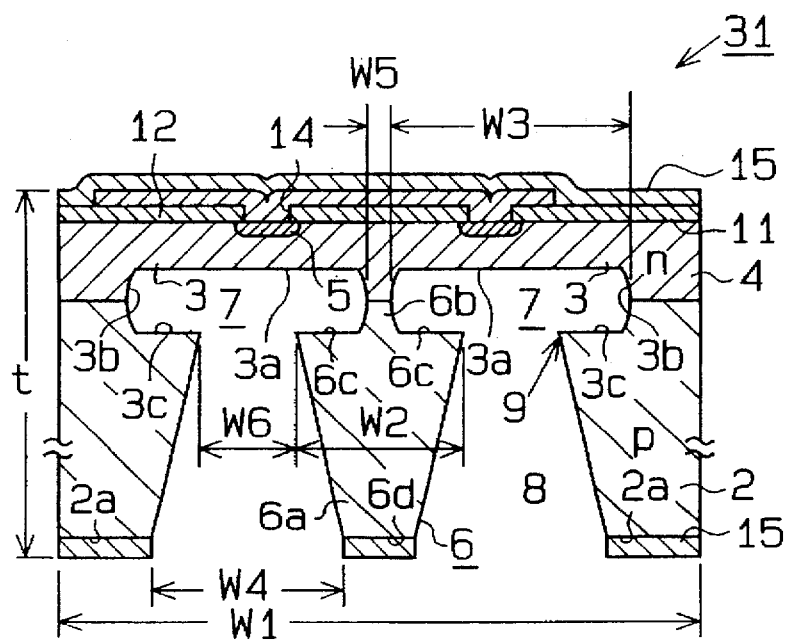

The P-type silicon area 21 is converted to a porous silicon area 25, as shown in FIG. 12, through an anodization as in the case of the first embodiment. The preferable conditions of the anodization in the second embodiment are as follows:

Current: 1 mA/cm2 to 100 mA/cm2

Time of Current Supply: 10 minutes to 600 minutes

Temperature of HF Solution: 10 C. to 70 C. (degrees Celsius)

After the completion of anodization, the porous silicon area 25 is removed by subjecting the substrate to a wet etching with TMAH. As a result, a vacant inner space and a mass portion 6 are obtained.

Apparently, the sensor manufacturing method according to the second embodiment has the same advantages as those of the method according to the first embodiment. The method according to the second embodiment has an additional advantage. Specifically, since the accelerometer sensor 31 has no opening 26 formed in the thin wall 3, the thin wall 3 of the sensor 31 is more resistant to breaking than the thin wall 3 in the first embodiment when undergoing a great acceleration. The method of the second embodiment enables the manufacturing of an accelerometer sensor 31 which is superior in its durability.

The method of the second embodiment is also characterized by the steps in which the P-type silicon area 21 is made porous and thereafter scooped out via the etched recess 8 open to the bottom of the substrate. In contrast with this, the method of the first embodiment is characterized by the steps in which the P-type silicon area 21 is made porous via the openings formed on the upper side of the substrate and is thereafter scooped out via the recess open to the bottom of the substrate. The method of the second embodiment therefore eliminates the forming of the P-type silicon area 22. This further facilitates the manufacturing of an accelerometer sensor.

3. THIRD EMBODIMENT

A method of manufacturing a three-dimensional accelerometer sensor of a surface micromachining semiconductor type, according to a third embodiment of the present invention, will now be described with reference to FIGS. 14 to 16. To avoid the redundant description, the same reference numerals are given to those components which are the same as the corresponding components of the first embodiment.

Figure 16:
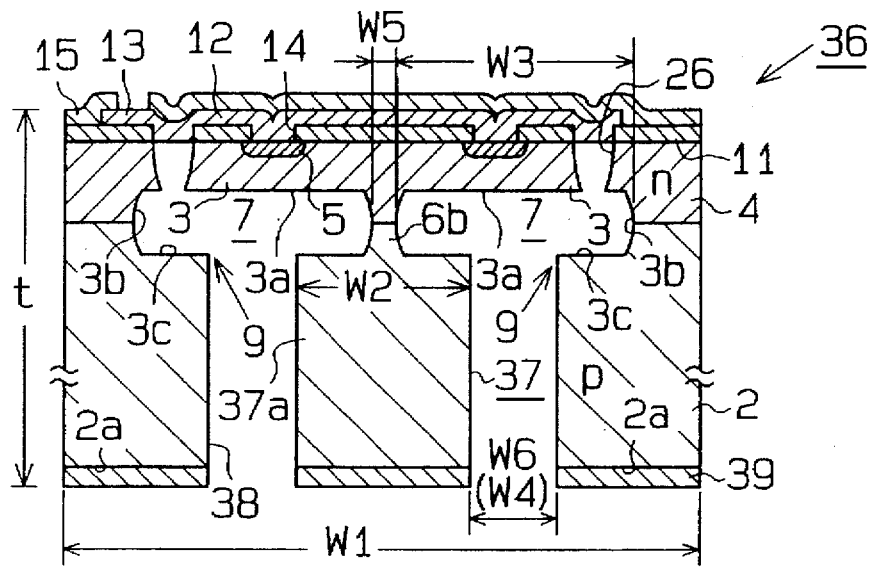

As shown in FIG. 16, a mass portion 37 and an etched recess 38 in an accelerometer sensor 36 of the third embodiment are different from the corresponding components of the first and second embodiments. Instead of being defined by a tapered wall, the etched recess 38 is provided as a directionally etched recess defined by a vertical wall. The horizontal cross sectional area of the etched recess 38 therefore is constant at any heights. Accordingly, the mass portion 37 excluding the cylindrical portion 6b (referred to as "great cylindrical portion 37a") has the same area of horizontal cross section at any heights.

In the third embodiment, the width W2 of the great cylindrical portion 37a is set to 500 μm as in the first embodiment. The width W6 of the through hole 9 is set equal to the width W4 of the entrance of the etched recess 38. The other measurements of the sensor 31 are set approximately equal to the measurements of the sensor 1 of the first embodiment.

A series of steps to manufacture the accelerometer sensor 36 of the third embodiment will now be described. First, the P-type silicon area 21 and the epitaxial layer 4 are formed on the silicon substrate 2, following the steps as described in the first embodiment (see FIGS. 4 and 5). The P-type silicon areas 22 for use in the formation of openings are formed by means of impurity doping. The strain gauges 5 are then formed in the epitaxial layer 4 through the strain gauge forming process (see FIG. 6).

The P-type silicon areas 21 and 22 are selectively made porous and converted to the porous silicon area 25 through an anodization under the same condition as the first embodiment (see FIG. 7). By carrying out the above-mentioned steps (see FIG. 8), the oxide film 11, contact holes 14, wiring pattern 12, bonding pads 13 and passivation film 15 are formed above the silicon substrate 2.

Figure 14:
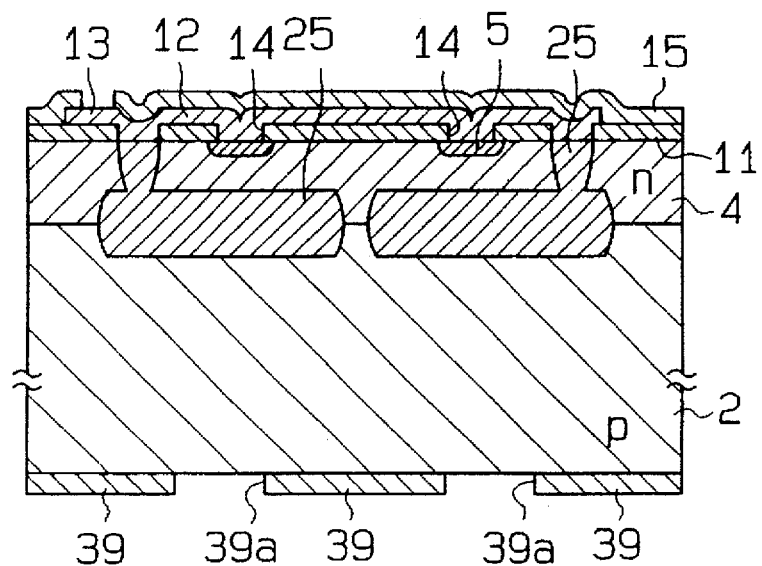
FIGS. 14, 15 and 16 are sectional views illustrating a series of steps for manufacturing an accelerometer sensor according to a third embodiment of the present invention.
Figure 15:
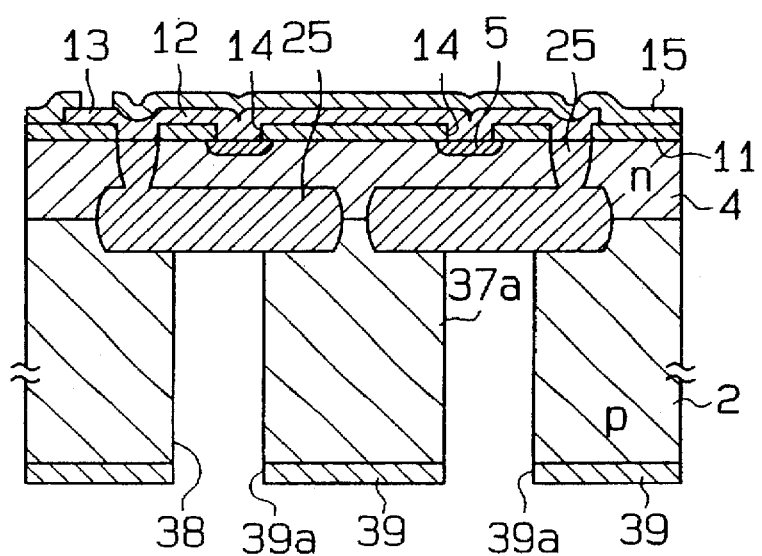

As shown in FIG. 14, a mask 39 made of metal, such as aluminum (Al), is formed on the bottom surface of the silicon substrate 2 by means of sputtering technique. For an ion etching to be performed later, a doughnut-shaped opening 39a is formed in the mask 39 leaving a part of the mask 39 in the center of the opening 39a. The circular part of the mask 39 left in the center of the opening 39a will form a part of the great cylindrical portion 37a of the mass portion 37.

The bottom of the silicon substrate 2 is subjected to an ion beam etching with accelerated inert gas ions. The ion beam etching process forms an etched recess 38 extending vertically, i.e., in the direction of the thickness of the silicon substrate 2. The formation of the etched recess 38 is not affected by the crystal orientation of the silicon substrate 2.

As the ion beam etching proceeds, the upper bottom of the recess 38 gradually goes up in the substrate, and eventually reaches the bottom of the porous silicon area 25. Consequently, this forms the great cylinder portion 37a of the mass portion 37. The porous silicon area 25 is then removed by subjecting the substrate to a crystal anisotropic etching with TMAH as the etchant. This wet etching provides the vacant inner space 7 in the area which has been occupied by the porous silicon area 25. In this way, the accelerometer sensor 37 shown in FIG. 16 is obtained.

The sensor manufacturing method of the third embodiment has the same advantages as those in the first embodiment, and has an additional advantage. That is, since the volume of the mass portion 37 in the accelerometer 36 is greater than that of the mass portion 6 in the first embodiment, the sensitivity of the accelerometer sensor 36 can be more easily improved.

Furthermore, the directionally etched recess 38 is defined not by a tapered wall but by a vertical wall. This is advantageous in downsizing the accelerometer sensor 36. Additionally, according to the method of the third embodiment, the formation of the mass portion 37 is not affected by or independent from the crystal orientation of the substrate 2. Therefore, as long as a mass portion is designed to have the same sectional shape at any heights, the mass portion can be formed to have other shapes than a cylindrical shape (e.g. prism).

Although only three embodiments of the present invention have been described herein, it should be apparent to those skilled in the art that the present invention may be embodied in many other specific forms without departing from the spirit or scope of the invention. Particularly, it should be understood that the invention may be embodied in the following forms.

Figure 18:
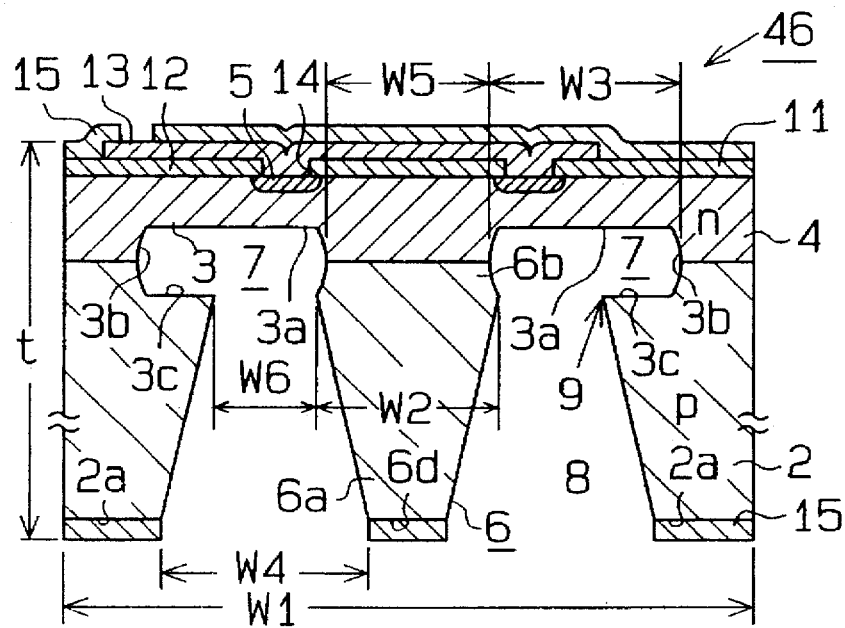
FIGS. 17 and 18 are sectional views of three modified accelerometer sensors according to the present invention.
Figure 17:
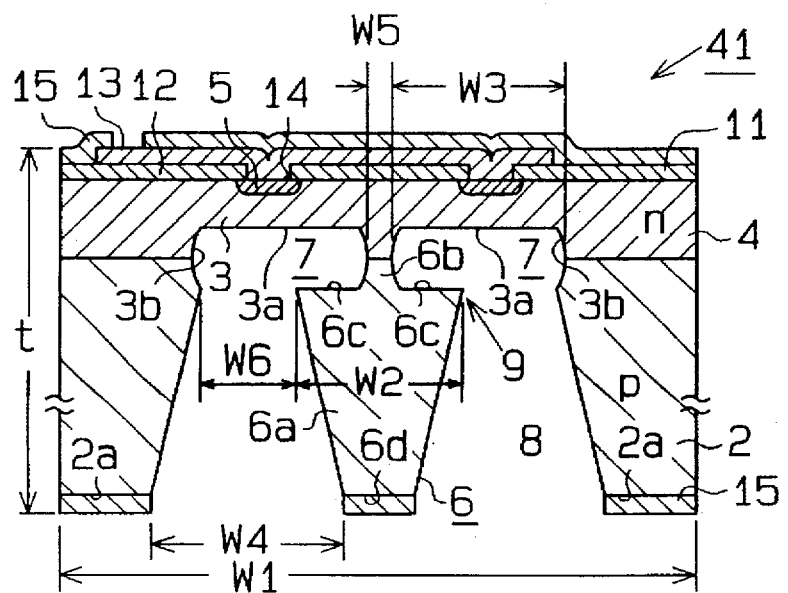

Accelerometer sensors shown in FIGS. 17 and 18. The accelerometer sensor 41 shown in FIG. 17 is substantially the same as the accelerometer sensor 31 of the second embodiment except that the width W3 of an inner space 7 of the accelerometer sensor 41 is set narrower than the width W3 in the accelerometer sensor 31. The accelerometer sensor 46 shown in FIG. 18 is substantially the same as the accelerometer sensor 31 of the second embodiment except that the average diameter W5 of the cylindrical portion 6b of the accelerometer sensor 46 is set larger than the W5 of the accelerometer sensor 31.

The four openings 26, as described in the first embodiment, can be integrated in a single opening.

The crystal orientation of the P-type silicon used for a substrate 2 may be (1,1,1,) or (1,1,0) other than (1,0,0,).

Instead of TMAH, it is permissible to use other alkaline etchant for wet etching, such as KOH, hydrazine and EPW (ethylenediamine-pyrocatechol-water).

Instead of Al, it is permissible to use gold (Au) as a metal for forming the wiring pattern 12 and the bonding pads 13.

In manufacturing the accelerometer 1 or 31, it is permissible to replace the epitaxial layer 4 of N-type single crystal silicon with a layer of N-type polycrystalline silicon or amorphous silicon. However, the use of the epitaxial layer 4 of N-type single silicon as described in the embodiments is most preferable to improve the sensitivity of a sensor.

In the first, second and third embodiments, it is permissible to replace the strain gauges 5 formed through diffusion process with thin film strain gauges made of Cr or polycrystalline silicon.

In the third embodiment, it is permissible to perform a dry etching such as a reactive ion etching (RIE) and a reactive ion beam etching (RIBE) instead of performing a non-reactive etching. In these dry etchings, gases such as $SF_6$, $CCl_4$, $CF_4$, $CF_3Cl$, $CF_4+H_2$, $CF_3Br$, $SiCl_4$, $CF_2Cl_2$ can be used.

In the first, second and third embodiments, the wiring pattern 12 and the bonding pads 13 should be formed after the gauge forming process.

The "anodization" in the present invention refers to a process or technique of supplying a current to a silicone substrate in electrolytic solution with the substrate connected to an anode of a power supply, thereby making a part of silicone substrate porous.

Therefore, the present examples and embodiments are to be considered as illustrative and not restrictive and the invention is not to be limited to the details given herein, but may be modified within the scope of the appended claims.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing an accelerometer sensor, said sensor comprising a silicon substrate; an epitaxial layer deposited on said substrate; a strain gauge provided in said epitaxial layer; and a mass portion joining with said epitaxial layer and located in an opening formed in said substrate, said method comprising the steps of:

forming a first P-type silicon area in a part of an upper area of a substrate made of P-type single crystal silicon, by means of impurity doping;

forming an epitaxial layer, made of N-type single crystal silicon, on a side of said silicon substrate, so that said first P-type silicon area is located between said silicon substrate and said epitaxial layer;

forming a second P-type silicon area in a part of said epitaxial layer by means of impurity doping, said first and second P-type silicon areas for use in the formation of an inner space in the sensor;

forming a strain gauge in a part of said epitaxial layer;

forming a resist over said epitaxial layer;

subjecting a composite of said silicon substrate and said epitaxial layer to an anodization in which said silicon substrate is used as an anode, thereby to convert said first and second P-type silicon areas to a porous silicon area;

providing a wiring pattern connected to said strain gauge;

forming a mask with an opening necessary for forming a mass portion on a lower surface of said silicon substrate; and applying an etching through the opening of said mask to said porous silicon area as well as said silicon substrate, thereby forming a mass portion joining with said epitaxial layer and located in an opening formed in said substrate.

2. The method according to claim 1, wherein said etching step comprises the steps of:

forming a recess which defines said mass portion in said silicon substrate by subjecting said silicon substrate to a crystal anisotropic etching through the opening of said mask; and hollowing said porous silicon area by means of a wet etching of said porous silicon area through said recess.

3. The method according to claim 1, wherein said etching step comprises the steps of:

forming a recess which defines said mass portion in said silicon substrate by subjecting said silicon substrate to an ion etching through the opening of said mask; and hollowing said porous silicon area by means of a wet etching of said porous silicon area through said recess.

4. A method of manufacturing an accelerometer sensor, said sensor comprising a silicone substrate; an epitaxial layer deposited on said substrate; a strain gauge provided in said epitaxial layer; and a mass portion joining with said epitaxial layer and located in an opening formed in said substrate, said method comprising the steps of:

forming a P-type silicon area in a part of an upper area of a substrate made of P-type single crystal silicon, by means of impurity doping;

forming an epitaxial layer, made of N-type single crystal silicon, on a side of said silicon substrate, so that said P-type silicon area is located between said silicon substrate and said epitaxial layer;

forming a strain gauge, made of P-type silicon, in a part of said epitaxial layer;

providing a wiring pattern connected to said strain gauge;

forming a mask with an opening necessary for forming a mass portion on a lower surface of said silicon substrate;

forming a recess which defines a mass portion in said silicon substrate by subjecting said silicon substrate to an etching through the opening of said mask;

subjecting said silicon substrate to an anodization in which said silicon substrate is used as an anode, thereby to convert said P-type silicon area to a porous silicon area; and hollowing said porous silicon area by means of a wet etching of said porous silicon area.

5. A method of manufacturing an accelerometer sensor comprising a mass portion, said method comprising the steps of:

providing a first silicon layer serving as a substrate;

forming a P-type silicon area in an upper area of said first silicon layer, by means of impurity doping;

forming a second silicon layer on said first silicon layer through vapor phase epitaxy, so that said P-type silicon area is located between said first and second silicon layers;

forming a recess which defines a mass portion in said first silicon layer;

supplying a current to said first and second silicon layers in an electrolytic solution while one of said first and second silicon layers is connected to an anode of a power supply, thereby converting said P-type silicon area to a porous silicon area; and hollowing said porous silicon area by means of a wet etching of said porous silicon area.

6. The method according to claim 5, wherein at said current supplying step a temperature of said electrolytic solution is in the range of 10 to 70 degrees Celsius, the current is in the range of 1 to 100 mA/cm$^2$.

* * * * *